(12) United States Patent
Kunitake et al.

(10) Patent No.: US 8,398,754 B2
(45) Date of Patent: Mar. 19, 2013

(54) PROTON CONDUCTING MEMBRANE AND METHOD FOR PRODUCING PROTON CONDUCTING MEMBRANE

(75) Inventors: Toyoki Kunitake, Wako (JP); Yuanzhi Li, Wako (JP); Yoshitaka Aoki, Wako (JP); Emi Muto, Wako (JP)

(73) Assignee: Riken, Wako-Shi (JP)

( * ) Notice: Subject to any disclaimer, the term of this patent is extended or adjusted under 35 U.S.C. 154(b) by 216 days.

(21) Appl. No.: 12/680,174

(22) PCT Filed: Sep. 25, 2008

(86) PCT No.: PCT/JP2008/067273
§ 371 (c)(1),
(2), (4) Date: Jun. 30, 2010

(87) PCT Pub. No.: WO2009/041479
PCT Pub. Date: Apr. 2, 2009

(65) Prior Publication Data
US 2010/0284880 A1    Nov. 11, 2010

(30) Foreign Application Priority Data
Sep. 28, 2007  (JP) ................................ 2007-253611

(51) Int. Cl.
*B01D 53/22* (2006.01)
(52) U.S. Cl. ................. 96/4; 95/43; 95/45; 96/10; 96/11
(58) Field of Classification Search ................ 95/43, 45; 96/4, 10, 11
See application file for complete search history.

(56) References Cited

U.S. PATENT DOCUMENTS

| 5,932,361 A * | 8/1999 | Belyakov et al. ............. 428/688 |
| 7,071,121 B2 * | 7/2006 | Punsalan et al. ............. 438/778 |
| 2004/0028913 A1 * | 2/2004 | Hennige et al. ............. 428/446 |

(Continued)

FOREIGN PATENT DOCUMENTS

| EP | 0838258 A1 | 4/1998 |
| EP | 1909295 A1 | 4/2008 |

(Continued)

OTHER PUBLICATIONS

Webster's Third New International Dictionary, Unabridged, "derived," 1993.*

(Continued)

*Primary Examiner* — Jason M Greene
*Assistant Examiner* — Anthony Shumate
(74) *Attorney, Agent, or Firm* — Birch, Stewart, Kolasch & Birch, LLP

(57) ABSTRACT

A proton conducting membrane comprising, as a main component, a ceramic structure in which an oxygen atom of a metal oxide is bonded through the oxygen atom with at least one group derived an oxygen acid selected from —B(O)$_3$—, —S(=O)$_2$(O)$_2$—, —P(=O)(O)$_3$—, —C(=O)(O)$_2$—, and —N(O)$_3$—, wherein the metal oxide and said at least one group derived from the oxygen acid share the oxygen atom, the proton conducting membrane being made by a sol-gel reaction of the oxygen acid or its precursor and a precursor of the metal oxide in order to obtain a sol-gel reaction product, followed by heating of the sol-gel reaction product at a temperature in a range of 100° C. to 600° C., the oxygen acid or its precursor being selected from a boric acid, a sulfuric acid, a phosphoric acid, a carbonic acid, a nitric acid, and precursors thereof. Thus, a novel proton conducting membrane is provided.

15 Claims, 15 Drawing Sheets

U.S. PATENT DOCUMENTS

| | | | |
|---|---|---|---|
| 2005/0014056 A1 * | 1/2005 | Zuber et al. | 429/34 |
| 2006/0210852 A1 * | 9/2006 | Datta et al. | 429/23 |
| 2009/0220840 A1 | 9/2009 | Yamaguchi et al. | |
| 2010/0075193 A1 | 3/2010 | Kunitake et al. | |

FOREIGN PATENT DOCUMENTS

| | | |
|---|---|---|
| EP | 1942507 A1 | 7/2008 |
| JP | 10-069817 A | 3/1998 |
| JP | 2003-146665 A | 5/2003 |
| JP | 2003-168446 A | 6/2003 |
| JP | 2003-313233 A | 11/2003 |
| WO | WO-02/47801 A1 | 6/2002 |
| WO | WO 03069711 A2 | 8/2003 |
| WO | WO-2006134809 A1 | 12/2006 |
| WO | WO-2007/029346 A1 | 3/2007 |

OTHER PUBLICATIONS

Oxford English Dictionary, "stannum" Oxford University Press, Second edition, 1989.*

Haile, S.M., et al., "Solid Acids As Fuel Cell Electrolytes", Nature, Apr. 19, 2001, vol. 410, pp. 910-913.

Nagao, M. et al., "Proton Conduction in $In^{3}+$-Doped $SnP_2O_7$ at Intermediate Temperatures", Journal of the Electrochemical Society, 2006, vol. 153, pp. A1604-A1609.

Extended European Search Report issued on Nov. 26, 2012, in corresponding European Patent Application No. 08834041.9.

* cited by examiner

PROTON CONDUCTING MEMBRANE AND METHOD FOR PRODUCING PROTON CONDUCTING MEMBRANE

This application is the National Stage under 35 U.S.C. §371 of International Application PCT/JP2008/067273 filed in the JPO on Sep. 25, 2008. This application claims priority under 35 USC §119(a)-(d) of Japanese Application JP 2007-253611, filed on Sep. 28, 2007.

TECHNICAL FIELD

The present invention relates to a proton conducting membrane and a method for producing a proton conducting membrane.

BACKGROUND ART

Proton conducting materials containing solid acids have been widely used. For example, Non-Patent Literature 1 describes that $CsHSO_4$ and $CsH^2PO_4$, each of which is a solid acid, become favorable proton conductors at 230° C. or higher. Non-Patent Literature 2 describes that crystalline $Sr_{1-x}In_xP_2O_7$ exhibits a very high proton conductivity around 200° C. Each of these substances, however, has a problem of a poor membrane-forming property. If there is an inorganic proton conducting material, i.e., a proton conducting membrane having a fine membrane-forming property, this will further expand the range of choices for a proton conducting membrane depending on the purpose and/or the like.

[Non-Patent Literature 1]
S. M. Haile et al. Nature 410, 910 (2001)
[Non-Patent Literature 2]
M. Nagao, et al., J. Electrochem. Soc., 153, A16004 (2006)

SUMMARY OF INVENTION

An object of the present invention is to solve the foregoing problem, and to provide a novel proton conducting membrane in which a material different from conventional ones is used.

In order to solve the foregoing problem, the inventors of the present invention studied a proton conducting membrane obtained by a combination of a precursor of a metal oxide and an oxygen acid or its precursor. As a result, the inventors of the present invention found the following fact: Subjecting the precursor of the metal oxide and the oxygen acid or its precursor to a sol-gel reaction and a thermal treatment gives a ceramic structure having an excellent proton conductivity. Thus, the present invention was completed.

(1) A proton conducting membrane containing, as a main component, a ceramic structure in which an oxygen atom of a metal oxide is bonded through the oxygen atom with at least one group derived from the oxygen acid selected from —B(O)$_3$—, —S(=O)$_2$(O)$_2$—, —P(=O)(O)$_3$—, —C(=O)(O)$_2$—, and —N(O)$_3$—, wherein the metal oxide and said at least one group derived from the oxygen acid share the oxygen atom.

(2) A proton conducting membrane made by a sol-gel reaction of an oxygen acid or its precursor and a precursor of a metal oxide in order to obtain a sol-gel reaction product, followed by heating of the sol-gel reaction product.

(3) The proton conducting membrane as set forth in (2), the oxygen acid or its precursor being selected from a boric acid, a sulfuric acid, a phosphoric acid, a carbonic acid, a nitric acid, and precursors thereof.

(4) The proton conducting membrane as set forth in (2) or (3) being made by heating of the sol-gel reaction product having been subjected to the sol-gel reaction, the heating being performed at a temperature in a range of 100° C. to 600° C.

(5) The proton conducting membrane as set forth in any one of (2) through (4), wherein the precursor of the metal oxide is a metal alkoxide.

(6) The proton conducting membrane as set forth in any one of (2) through (5), wherein the precursor of the metal oxide contains at least one tetravalent metal ion as a main component of its metal component.

(7) The proton conducting membrane as set forth in (6), wherein said at least one tetravalent metal ion is selected from a hafnium ion, a titanium ion, a zirconium ion, and a stannum ion.

(8) The proton conducting membrane as set forth in claim (6) or (7), wherein the precursor of the metal oxide further contains at least one trivalent metal ion as its metal component.

(9) The proton conducting membrane as set forth in (8), wherein said at least one trivalent metal ion is selected from an yttrium ion, an aluminum ion, an indium ion, a scandium ion, and lanthanoid ions including a lanthanum ion.

(10) The proton conducting membrane as set forth in (8) or (9), wherein said at least one trivalent metal ion is contained in a range of 0.03 mol to 0.20 mol with respect to 1 mol of said at least one tetravalent metal ion.

(11) The proton conducting membrane as set forth in any one of (1) through (10), wherein the proton conducting membrane is amorphous.

(12) A method for manufacturing a proton conducting membrane, including the steps of: subjecting an oxygen acid or its precursor and a precursor of a metal oxide to a sol-gel reaction in order to obtain a sol-gel reaction product; and thereafter subjecting the sol-gel reaction product to a thermal treatment.

(13) The method as set forth in (12), wherein the thermal treatment being performed at a temperature in a range of 100° C. to 600° C.

(14) The method as set forth in (12) or (13), wherein the proton conducting membrane is a proton conducting membrane as set froth in any one of (1) through (11).

For a fuller understanding of the nature and advantages of the invention, reference should be made to the ensuing detailed description taken in conjunction with the accompanying drawings.

DESCRIPTION OF EMBODIMENTS

Figure 1:
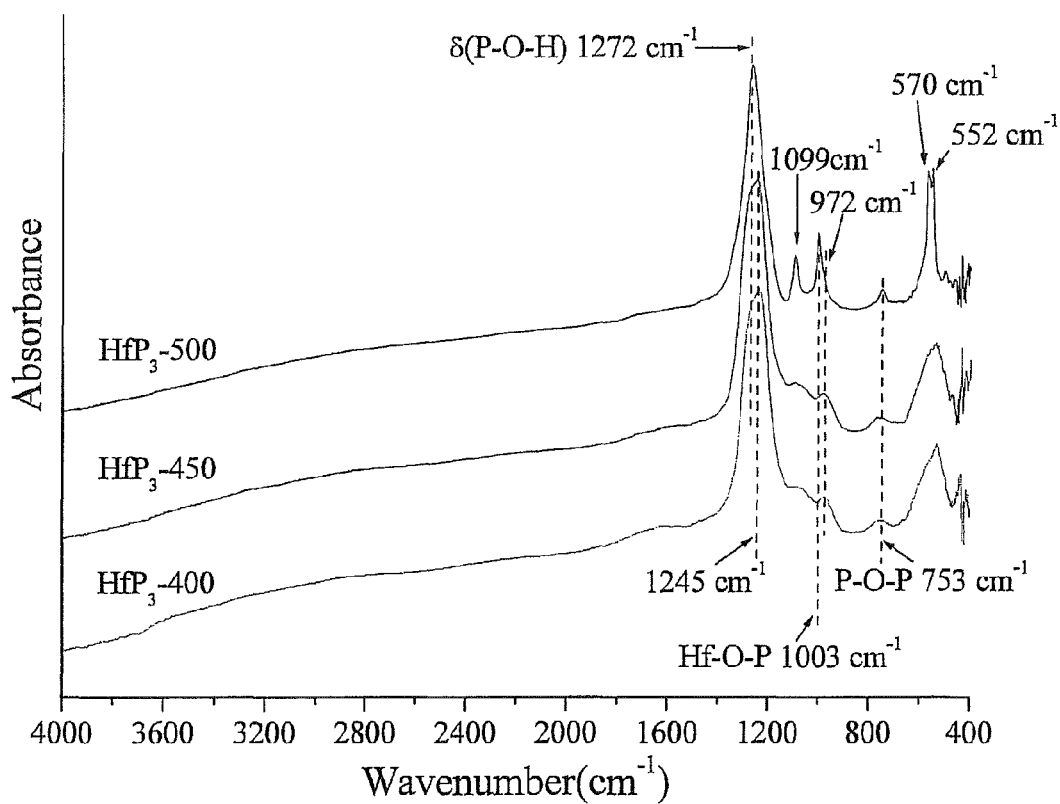
FIG. 1 shows the results of a measurement of FTIR spectra of HfP$_3$-400, HfP$_3$-450, and HfP$_3$-500.

The following will describe the present invention in detail. A numerical range expressed by the wording "a number to another number" herein means the range that includes the former number as the lower most limit of the range and the latter number as the uppermost limit thereof.

A proton conducting membrane of the present invention is, for example, a proton conducting membrane containing, as a main component, a ceramic structure in which an oxygen atom of a metal oxide is bonded through the oxygen atom with at least one group derived from an oxygen acid selected from $—B(O)_3—$, $—S(=O)_2(O)_2—$, $—P(=O)(O)_3—$, $—C(=O)(O)_2—$, and $—N(O)_3—$, wherein the metal oxide and said at least one group derived from the oxygen acid share the oxygen atom, the proton conducting membrane being generally made by a sol-gel reaction of a precursor of the metal oxide and the oxygen acid or its precursor in order to obtain a sol-gel reaction product, followed by heating of the sol-gel reaction product. The "main component" herein refers to a component which is contained in a largest amount (weight ratio). Further, the proton conducting membrane of the present invention is generally amorphous.

(Oxygen Acid or its Precursor)

The oxygen acid used in the present invention is not limited to any specific one. Preferable examples of the oxygen acid encompass a boric acid, a sulfuric acid, a phosphoric acid, a carbonic acid, and a nitric acid. Of these, the phosphoric acid is preferable. As the oxygen acid or its precursor, one kind may be singly used, or two or more kinds may be used. The precursor of the oxygen acid refers to one which functions substantially the same as the oxygen acid does in a sol-gel reaction. Examples of the precursor encompass $P_2O_5$, a polyphosphoric acid, and $SO_3$.

(Precursor of Metal Oxide)

Examples of the precursor of the metal oxide used in the present invention encompass all compounds which can produce a metal oxide by a sol-gel reaction. Specific examples of the precursor of the metal oxide encompass a metal alkoxide, an isocyanate metal compound, halide, a chelate complex, and an organic metal complex. Of these, the metal alkoxide is preferable.

The precursor of the metal oxide of the present invention preferably contains a tetravalent metal ion as a main component of its metal component. The metal oxide precursor more preferably contains, as the main component of its metal component, at least one selected from a hafnium ion, a titanium ion, a zirconium ion, and a stannum ion. The "main component" herein refers to a component which accounts for a largest amount (mol %) of the metal component.

Further, in the present invention, it is preferable that a trivalent metal ion is contained in addition to the tetravalent metal ion. It is preferable to use, as the trivalent metal ion, at least one selected from an yttrium ion, an aluminum ion, an indium ion, a scandium ion, and lanthanoid ions including a lanthanum ion. Of these, yttrium is particularly preferable. The trivalent metal ion is preferably contained in a range of 0.03 mol to 0.20 mol with respect to 1 mol of the tetravalent metal ion, more preferably in a range of 0.03 mol to 0.10 mol with respect to 1 mol of the metal ion. Causing the trivalent metal ion to be contained together with the tetravalent metal ion is preferable, because this may further enhance the proton conductivity.

The metal alkoxide used as the metal oxide precursor is more preferably a metal alkoxide represented by $M(OR)_n$. Here, the "M" is a rare earth metal atom, aluminum, zirconium, niobium, hafnium, tantalum or a first transitional metal atom. Preferably, the "M" is cerium, aluminum, titanium, zirconium, hafnium, niobium, yttrium, niobium, lanthanum or tantalum.

The "R" signifies a group containing an alkyl group. It is preferable that the "R" is a C1-C7 alkyl group, alkyl carbonyl group, alkyl ketone group or alkyl diketone group.

The "n" is preferably an integral number of 1 to 6.

Specific examples of $M(OR)_n$ encompass: $Ce(OC_2H_4OCH_3)_3$; $Hf(OC_4H_9)_4$; $Ta(OC_2H_5)_5$; $Zr(OC_4H_9)_4$; $Al(OCH(CH_3)_2)_3$; $La(OC_2H_4OCH_3)_3$; $Y(OC_2H_4OCH_3)_3$; $Nb(OC_2H_5)_5$; and $TiO(C_4H_9)_4$.

As the metal oxide precursor, one kind may be singly used, or two or more kinds may be used.

In the proton conducting membrane of the present invention, a molar ratio between the group derived from the oxygen acid and the metal oxide preferably ranges from 10:1 to 1:10, more preferably from 3:1 to 1:5.

(Method for Manufacturing Proton Conducting Membrane)

Next, the following describes a method for manufacturing the proton conducting membrane of the present invention. The proton conducting membrane of the present invention is manufactured by a sol-gel reaction of an oxygen acid or its precursor and a precursor of a metal oxide in order to obtain a sol-gel reaction product, followed by a thermal treatment subjected to the sol-gel reaction product. Generally, the following method is used: a solution (raw material solution) containing a precursor of a metal oxide and an oxygen acid or its precursor is applied onto a substrate in a layered form; and this is subjected to a sol-gel reaction and thereafter to a thermal treatment.

The application of the solution onto the substrate may be performed by a known method such as spin-coating. Employing the spin-coating is preferable, because this makes it possible to regulate the number of times of the application and to adjust a membrane thickness. Further, in the present invention, a layered product having thin layers stacked is preferable. By having this configuration, it is possible to form a membrane more evenly, thereby giving a thin membrane having a further excellent conductivity.

Here, a ratio (molar ratio) between the oxygen acid or its precursor and the metal oxide precursor in the raw material solution preferably ranges from 5:1 to 1:5, more preferably from 3:1 to 1:1.

A solvent of the raw material solution is not particularly limited, as long as it does not overstep the gist of the present invention. However, the solvent is preferably an organic solvent, preferable examples of which encompass methoxyethanol, ethanol, and methanol. As the solvent, one kind may be singly used, or two or more kinds may be used in combination.

The sol-gel reaction is preferably performed by a steam treatment, a water treatment, or a heat treatment in the air with respect to the substrate on which the raw material solution has been spread. The water used in this procedure is preferably ion-exchanged water, for the purpose of preventing inclusion of impurities and/or the like and forming a thin layer made of a high-purity raw material solution.

After hydrolysis, a surface thereof may be dried by drying gas such as nitrogen gas, if necessary. Further, use of a catalyst such as an acid or a base makes it possible to drastically shorten the time required for the above steps.

The heating temperature is preferably in a range of 100° C. to 600° C., more preferably 120° C. to 500° C., further preferably 200° C. to 450° C. Performing the thermal treatment with such a temperature, the present invention is advantageous in that an oxide network is developed, so that a stable structure is obtained.

Note that the manufacturing method of the present invention can perform all steps at a temperature of 600° C. or lower or 500° C. or lower. This prevents performance impairment caused by a reaction with another cell constituent material. Also in terms of this point, the manufacturing method of the present invention is preferable.

Although a membrane thickness of the proton conducting membrane of the present invention is not particularly limited, for example, the membrane thickness may be in a range of 0.005 μm to 1.0 μm, or may be 100 nm or less (preferably not less than 10 nm) or particularly may be 50 nm or less.

Further, even if the proton conducting membrane of the present invention has a thin membrane thickness of 100 nm or less, for example, the proton conducting membrane can retain a sufficient strength. That is, the proton conducting membrane of the present invention has a self-supporting property.

The proton conducting membrane of the present invention preferably has a proton conductivity of $1\times10^{-5}$ S·cm$^{-1}$ or more, more preferably $1\times10^{-4}$ S·cm$^{-1}$ or more, for example, at a working temperature in a range of 100° C. to 500° C., preferably 200° C. to 400° C.

It is considered that a fuel cell is desirable to be worked at a high temperature because this increases catalytic activity and accordingly reduces an electrode overvoltage. However, the fuel cell must be worked at a temperature at which water control is possible, since a proton conducting membrane conventionally used in the fuel cell does not function in the absence of water. On the other hand, in the present invention, a proton conductivity is retained even in a dried state. Thus, the present invention is advantageous in that the present invention can contribute to simplification of a fuel cell system.

Further, a surface resistivity of the proton conducting membrane of the present invention can be 10 Ωcm$^2$ or lower, 1 Ωcm$^2$ or lower, particularly 0.2 Ωcm$^2$ or lower, preferably 0.15 Ωcm$^2$ or lower. Particularly, it is more preferable that the surface resistivity has the above value at a working temperature in a range of 100° C. to 500° C., preferably 200° C. to 400° C. Having such a small surface resistivity, the proton conducting membrane achieves an advantage of an increased proton conductive efficiency, which improves e.g., the performance of the fuel cell.

The proton conducting membrane of the present invention can be used as an electrode membrane in a solid fuel cell. An electrode to be used in a membrane electrode assembly for use in a fuel cell may be made of an electrically conductive material carrying fine particles of a catalyst metal, and may contain one of or both of a water repellent and a binder, if necessary. Further, a layer including (i) an electrically conductive material not carrying a catalyst and (ii) at least one of a water repellent and an adhesive (if necessary) may be formed outside the catalyst layer.

The catalyst metal to be used in this electrode may be any metal, as long as it accelerates an oxidation reaction of hydrogen and a reduction reaction of oxygen. Examples of the catalyst metal encompass platinum, gold, silver, palladium, iridium, rhodium, ruthenium, iron, cobalt, nickel, chrome, tungsten, manganese, vanadium, and alloys thereof.

Of these catalysts, platinum is particularly used in many cases. Note that a metal used as the catalyst preferably has a particle diameter of 1 nm to 30 nm. In view of its cost, it is advantageous that the catalyst is attached to a carrier such as carbon, since this reduces an amount of the catalyst used. An amount of the catalyst held by the carrier preferably ranges from 0.01 mg/cm$^2$ to 10 mg/cm$^2$, in a state that the electrode is formed.

The electrically conductive material may be any electron-conductive material, examples of which encompass various metals and carbon materials.

Examples of the carbon material encompass: carbon black such as furnace black, channel black, and acetylene black; carbon fibers; carbon nanotube; activated charcoal; and graphite. One or more of these may be used either singly or in combination.

A method for assembling a proton conducting membrane and an electrode for use in a fuel cell is also not particularly limited, and may employ any known method. An example of a method for manufacturing the membrane-electrode assembly is as follows: Pt catalyst powder held by carbon is applied to carbon paper and heated to form a catalyst layer; subsequently, a proton conducting membrane solution having the same composition as that of a proton conducting membrane is applied to the catalyst layer, and the proton conducting membrane and the catalyst layer are integrated together through hot pressing.

Apart from this method, also employable are: a method for coating, in advance, Pt catalyst powder with a proton conducting membrane solution having the same composition as that of a proton conducting membrane; a method for applying catalyst past onto a proton conducting membrane; a method for forming an electrode on a proton conducting membrane by means of electroless plating; a method for causing a proton conducting membrane to adsorb a metal complex ion of the platinum group and thereafter reducing it; and the like.

A ceramic-membrane fuel cell is configured as follows: Thin carbon paper packing materials (supporting collectors) are brought into close contact with both sides of the proton conducting membrane-electrode assembly formed in the manner as above, and conductive separators (bipolar plates) are disposed on both sides thereof, each of which conductive separators serves both for polar chamber separation and for a gas supply path to the electrode. Thus, a single cell is given. A plurality of such single cells are laminated via e.g., a cooling plate.

EXAMPLES

The invention is described in more detail with reference to the following Examples, in which the material used, its amount and the ratio, the details of the treatment, the treatment process, and the like may be suitably modified or changed, as long as the modification or the change does not overstep the gist and the scope of the invention. Thus, the scope of the present invention is not limited to any of the specific Examples described below.

Example 1

Production of Hafnium-Phosphoric Acid Thin Membrane (Pretreatment of ITO Substrate)
A glass substrate coated with an ITO electrode (manufactured by Aldrich; ITO thickness: 30 nm, 2.5 cm×4 cm) (ITO substrate) was subjected to ultrasonic cleaning with ethanol for two minutes, and was brought into contact with nitrogen gas for drying.

(Preparation of Application Solution)

0.50 g of hafniumtetra n-butoxide (manufactured by Gelest) was added to 20 ml of 2-methoxyethanol, and the resultant was mixed at room temperature for five minutes, so that a solution was obtained. Subsequently, 0.21 g of diphosphorous pentoxide ($P_2O_5$) was added to 30 ml of 2-methoxyethanol, and the resultant solution was subjected to ultrasonic treatment until the solution became transparent. These solutions were mixed together, and stirred at room temperature for 10 minutes. Water was added to the mixture solution so that a metal oxide precursor concentration of the mixture solution was adjust to 18 mmol/L ultimately.

(Production of Thin Membrane)

The application solution was applied onto the ITO substrate by means of spin-coating at 3000 rpm for 20 seconds, so that a gel layer was formed. The gel layer was then dried out. This procedure was repeatedly performed 15 times, and annealing was performed at 400° C. for an hour. Further, the step for forming a gel layer and drying it out was repeatedly performed 15 times, and annealing was performed for an hour. Thus, a thin membrane was obtained. The annealing temperature was set to 400° C., 450° C., and 500° C., so that three types of thin membranes were formed.

(Observation with Scanning Electron Microscope (SEM))

Each thin membrane obtained was observed with use of a scanning electron microscope (SEM). For the observation, a field emission scanning electron microscope (S-5200; manufactured by Hitachi Ltd.) was used.

(Measurement with X-Ray Photoelectron Spectroscopy (XPS))

The composition of each thin membrane obtained was measured with use of ESCALAB250 (manufactured by VG Science).

(Measurement of Fourier Transform Infrared Spectroscopy (FTIR))

A silicon wafer coated with platinum was used as a substrate film of a thin membrane. On the silicon wafer, a thin membrane was formed in the same manner as above. The thin membrane was placed under vacuum at 250° C. for two hours, and was then cooled to room temperature. Afterward, the thin membrane was placed under pyridine vapor, and an FTIR spectrum of pyridine absorption was measured.

(Impedance Spectroscopy)

A proton conductivity of each thin membrane obtained was measured by means of an AC impedance method. Specifically, the thin membrane obtained was disposed on a platinum electrode (thickness: 100 nm, diameter: 1 mm), and an ITO electrode was disposed thereon. A metal wire was connected with the platinum electrode and the ITO electrode, and an impedance spectroscopy analysis was performed at 20 mV and at a frequency of 10 Hz to $10^7$ Hz.

The annealing temperatures for the thin membranes produced in the above process; a composition ratio of the application solution; and abbreviations used in the figures are shown below.

TABLE 1

| | Annealing Temp. (° C.) | Composition Ratio in Application Solution (Molar Ratio) | Abbreviation |
|---|---|---|---|
| Ex. 1 | 400 | Hf/P = 1.0/3 | $HfP_3$-400 |
| Ex. 1 | 450 | Hf/P = 1.0/3 | $HfP_3$-450 |
| Ex. 1 | 500 | Hf/P = 1.0/3 | $HfP_3$-500 |

Abbreviations in Table 1:
"Ex." stands for "Example".
"Temp." stands for "Temperature".

(Results)

FIG. 1 shows the results of the measurement of FTIR spectra of $HfP_3$-400, $HfP_3$-450, and $HfP_3$-500. As shown in FIG. 1, a peak derived from P—O—H was observed at a wavenumber of 1272 $cm^{-1}$, a peak derived from Hf—O—P was observed at a wavenumber of 1003 $cm^{-1}$, and a peak derived from P—O—P was observed at a wavenumber of 753 $cm^{-1}$.

Figure 2:
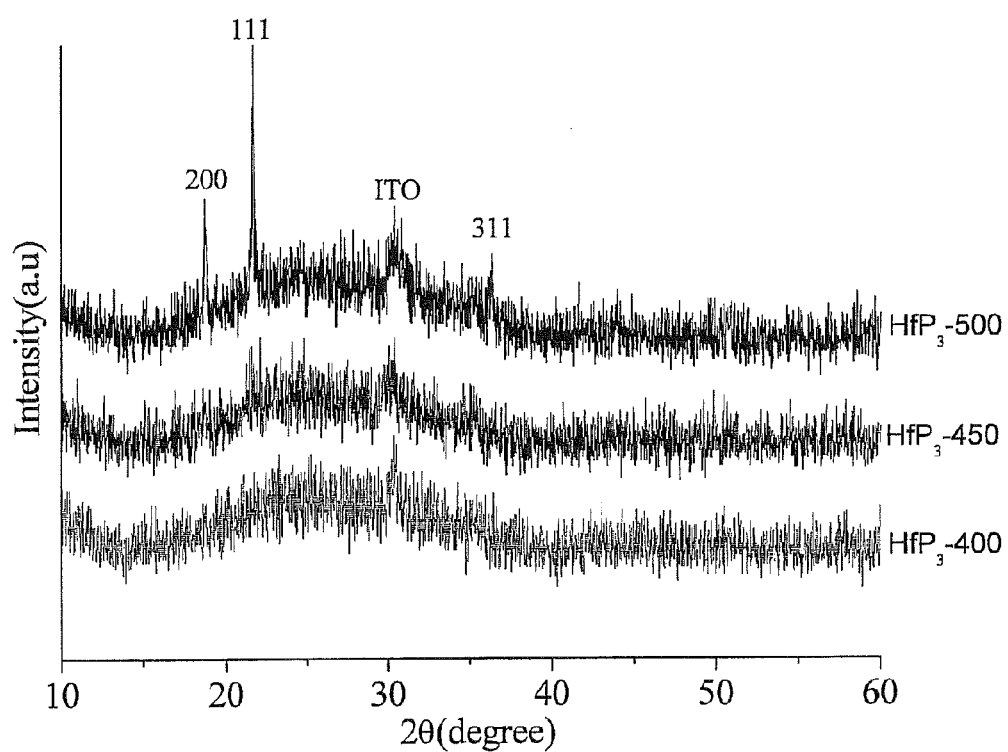
FIG. 2 shows XRD patterns of HfP$_3$-400, HfP$_3$-450, and HfP$_3$-500.

FIG. 2 shows X-ray diffraction patterns (XRD patterns) of $HfP_3$-400, $HfP_3$-450, and $HfP_3$-500. These results show that $HfP_3$-400, $HfP_3$-450, and $HfP_3$-500 were amorphous.

Figure 3:
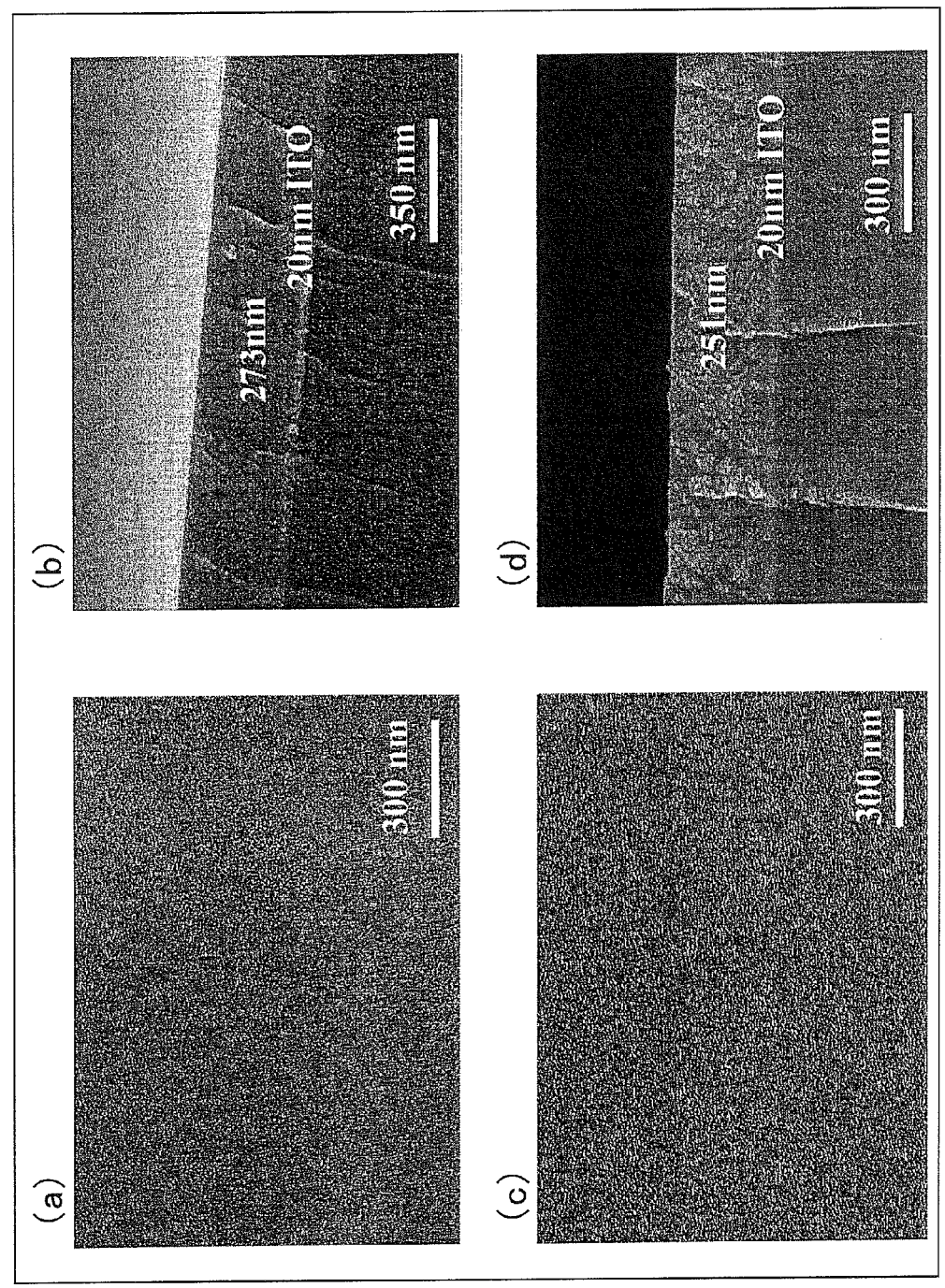
FIG. 3 shows the results of an SEM observation on HfP$_3$-400 and HfP$_3$-500.

FIG. 3 shows the results of the SEM observation on $HfP_3$-400 and $HfP_3$-500. (a) of FIG. 3 shows an upper surface of $HfP_3$-400; (b) of FIG. 3 shows a cross section of $HfP_3$-400; (c) of FIG. 3 shows an upper surface of $HfP_3$-500; and (d) of FIG. 3 shows a cross section of $HfP_3$-500. From these, it was confirmed that each of $HfP_3$-400 and $HfP_3$-500 was a fine thin membrane having no crack or the like. Further, it was also confirmed that the thin membrane obtained as $HfP_3$-400 was more favorable than $HfP_3$-500. A membrane thickness of $HfP_3$-400 was 273 nm, and that of $HfP_3$-500 was 251 nm.

Figure 4:
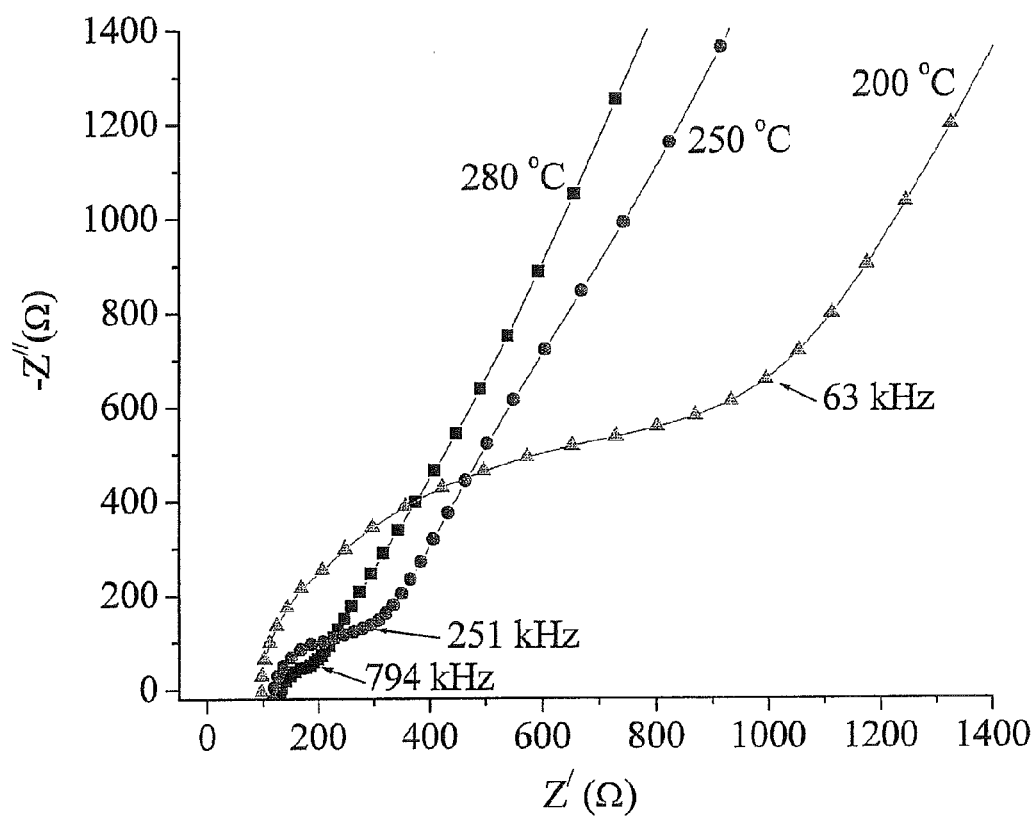
FIG. 4 shows the results of an impedance spectroscopy analysis on HfP$_3$-500.

FIG. 4 shows the results of the impedance spectroscopy analysis on $HfP_3$-500. Here, the horizontal axis represents a real part Z' (unit: Ω) (i.e., a part whose phase difference between a current and a voltage is zero) of the impedance, whereas the vertical axis represents an imaginary part −iZ″ (unit: Ω) (i.e., a part whose phase difference between a current and a voltage is π/2) of the impedance. The data in FIG. 4 shows −i Z″ and Z' of a total impedance Z measured at each frequency (in a range of $10^7$ Hz to 10 Hz). Here, the "Z" is expressed as follows:

$$Z=(|Z'|^2+|Z''|^2)^{1/2}$$

Figure 5:
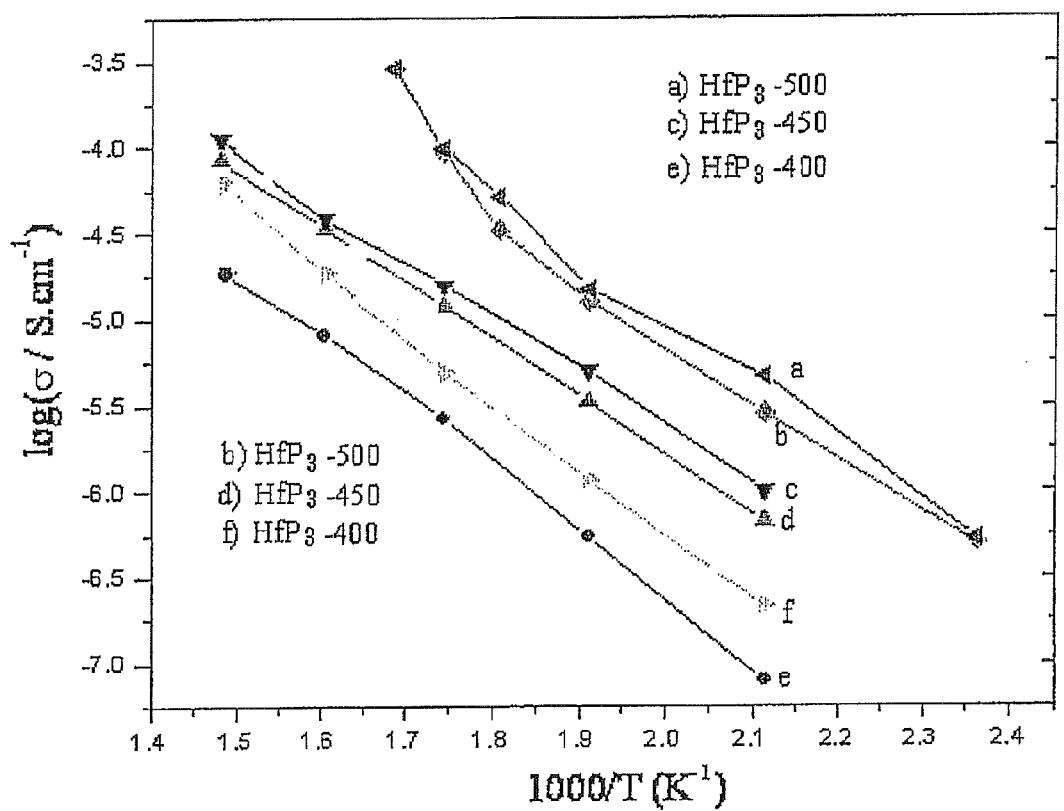
FIG. 5 shows temperature dependencies of proton conductivities of the thin membranes obtained in Example 1.

FIG. 5 shows temperature dependencies of proton conductivities of the thin membranes obtained in the above process. The "a", "c", and "e" are results measured under a dry condition, whereas the "b", "d", and "f" are results measured in a saturated vapor state at 20° C.

In a case of e) $HfP_3$-400 (dry), a high electric conductivity of $7.9 \times 10^{-8}$ $Scm^{-1}$ to $1.8 \times 10^{-5}$ $Scm^{-1}$ was obtained at a measurement temperature in a range of 200° C. to 400° C. Further, as is clear from the result of f) $HfP_3$-400, this thin membrane was found to have a higher proton conductivity in the presence of vapor, specifically, approximately 3.7 times higher proton conductivity.

These results show that a thin membrane of the present invention has a high proton conductivity even at a relatively low temperature or under a dry condition.

Figure 6:
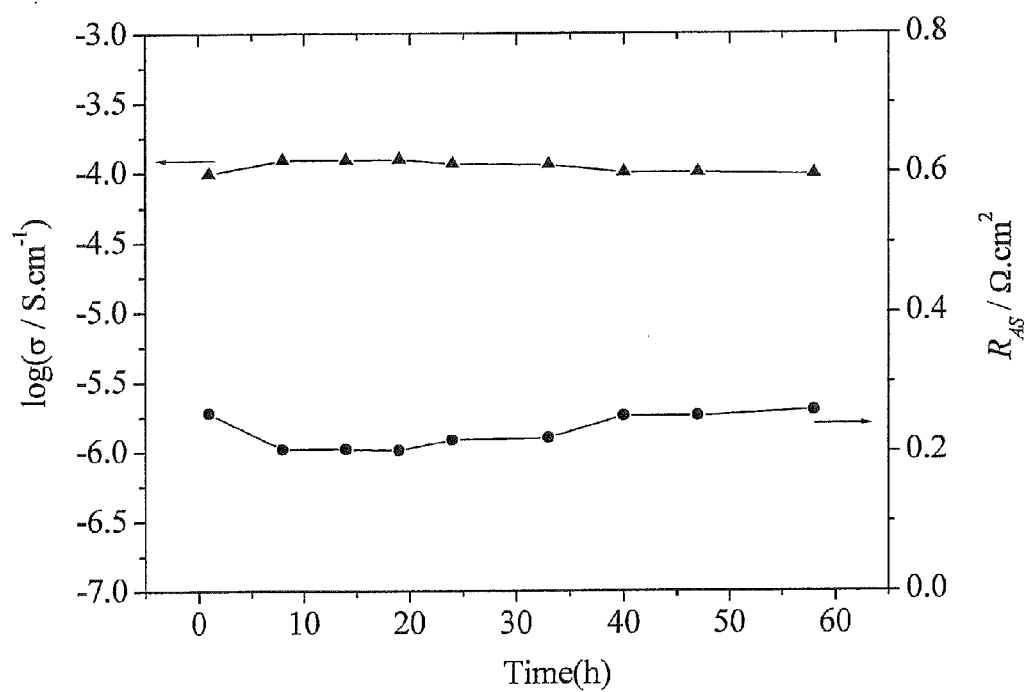
FIG. 6 shows the result of a measurement of a proton conductivity of HfP$_3$-500, which measurement was performed at 300° C. for 58 hours under a dry condition.

FIG. 6 shows the result of the measurement of a proton conductivity of $HfP_3$-500, which measurement was performed at 300° C. for 58 hours under a dry condition. The result in FIG. 6 shows that there was no damage or the like on the membrane, and that there was no change in the proton conductivity. This shows that a membrane of the present invention has a high stability.

Example 2

Production of Zirconium-Phosphoric Acid Thin Membrane and Production of Zirconium-Yttrium-Phosphoric Acid Thin Membrane (Pretreatment of ITO Substrate)

An ITO substrate was subjected to a pretreatment in the same manner as in Example 1.

(Preparation of Application Solution)

Zirconium-n-tetrabutoxide (manufactured by Kanto Chemical Co., Inc.) was added to 20 ml of 2-methoxyethanol, and the resultant solution was subjected to ultrasonic treatment until the solution became transparent. Yttrium methoxyethoxide (manufactured by Gelest, Inc.) was added to 20 ml of 2-methoxyethanol, and the resultant solution was subjected to ultrasonic treatment until the solution became transparent. $P_2O_5$ was dissolved in 30 ml of 2-methoxyethanol, which was then added to each of the above solutions, and the solutions were subjected to ultrasonic treatment for approximately six minutes until the solutions became transparent. These solutions were mixed together, and stirred at room temperature for 10 minutes. The resultant solution was adjusted so that an application solution finally obtained had a metal concentration of 20 mmol/L. Note that the added amounts of zirconium-n-tetrabutoxide, yttrium methoxyethoxide, and $P_2O_5$ were adjusted so that a molar ratio between zirconium, yttrium, and phosphor in each application solution was set to the value shown in the Table below.

(Production of Thin Membrane)

Thin membranes were produced in the same manner as in Example 1. Annealing was performed at annealing temperatures of 120° C. and 400° C.

TABLE 2

| | Annealing Temp. (° C.) | Composition Ratio in Application Solution (Molar Ratio) | Abbreviation |
|---|---|---|---|
| Ex. 2 | 400 | Zr/P = 1.0/3.0 | $ZrP_3$-400 |
| Ex. 2 | 400 | Zr/Y/P = 0.95/0.05/3.0 | $Zr_{0.95}Y_{0.05}P_3$-400 |
| Ex. 2 | 400 | Zr/Y/P = 0.90/0.10/3.0 | $Zr_{0.90}Y_{0.10}P_3$-400 |
| Ex. 2 | 120 | Zr/P = 1.0/3.0 | $ZrP_3$-120 |
| Ex. 2 | 120 | Zr/Y/P = 0.95/0.05/3.0 | $Zr_{0.95}Y_{0.05}P_3$-120 |
| Ex. 2 | 120 | Zr/Y/P = 0.90/0.10/3.0 | $Zr_{0.90}Y_{0.10}P_3$-120 |

Abbreviations in Table 2:
"Ex." stands for "Example".
"Temp." stands for "Temperature".

(Results)

The thin membranes obtained were evaluated as follows. Unless otherwise described, the measurements were performed in the same manner as in Example 1.

Figure 7:
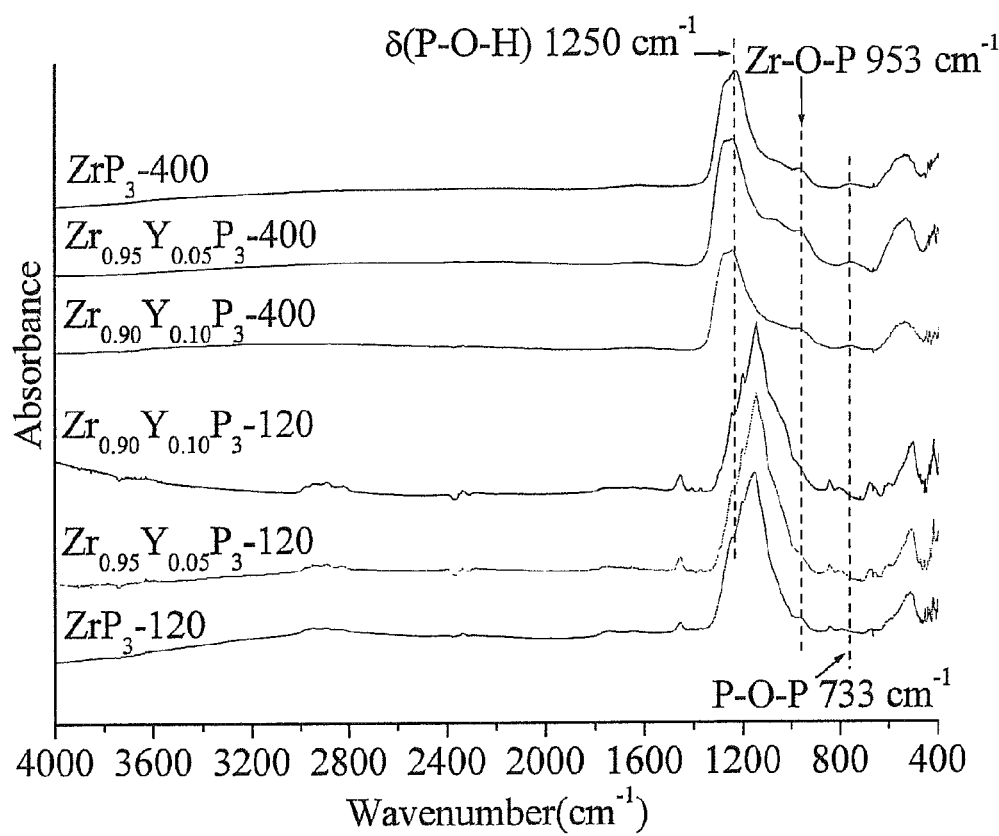
FIG. 7 shows the results of a measurement of FTIR spectra of proton conducting membranes obtained in Example 2.

FIG. 7 shows the results of the measurement of FTIR spectra of $ZrP_3$-400, $Zr_{0.95}Y_{0.05}P_3$-400, $Zr_{0.90}Y_{0.10}P_3$-400, $ZrP_3$-120, $Zr_{0.95}Y_{0.05}P_3$-120, and $Zr_{0.90}Y_{0.10}P_3$-120. As shown in FIG. 7, a peak derived from P—O—H was observed at a wavenumber of 1250 $cm^{-1}$, a peak derived from Zr—O—P was observed at a wavenumber of 953 $cm^{-1}$, and a peak derived from P—O—P was observed at a wavenumber of 733 $cm^{-1}$.

Figure 8:
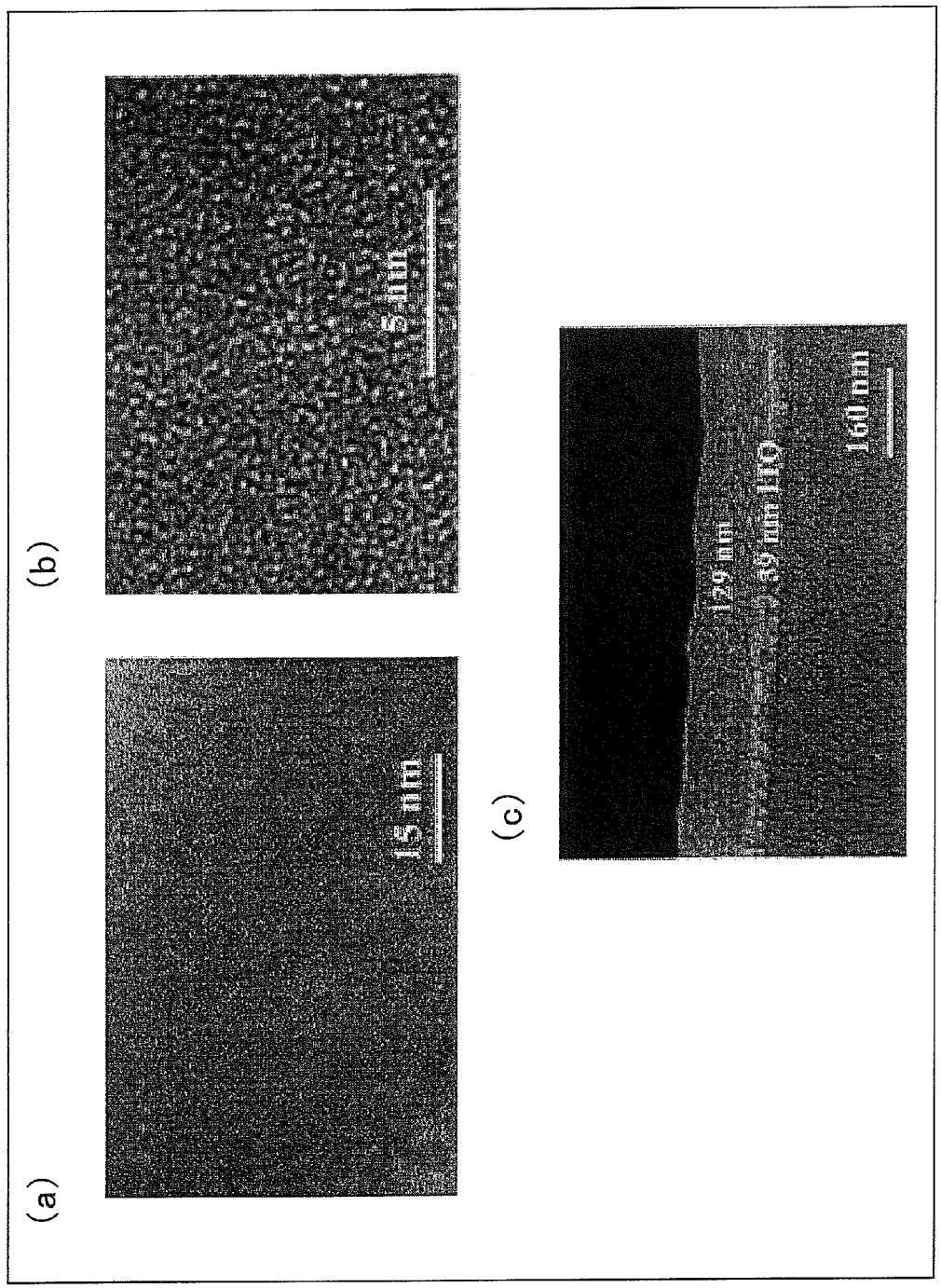
FIG. 8 shows the results of a TEM observation and an SEM observation on $Zr_{0.95}Y_{0.05}P_3$-400.

FIG. 8 shows the results of the transmission electron microscope (TEM) observation and the SEM observation on $Zr_{0.95}Y_{0.05}P_3$-400. (a) and (b) of FIG. 8 show the results of the TEM observation on a surface of the membrane; and (c) of FIG. 8 shows the result of the SEM observation on a cross section of the membrane. From these, it was confirmed that $Zr_{0.95}Y_{0.05}P_3$-400 was a fine thin membrane having no crack or the like. A membrane thickness thereof was 129 nm.

Figure 9:
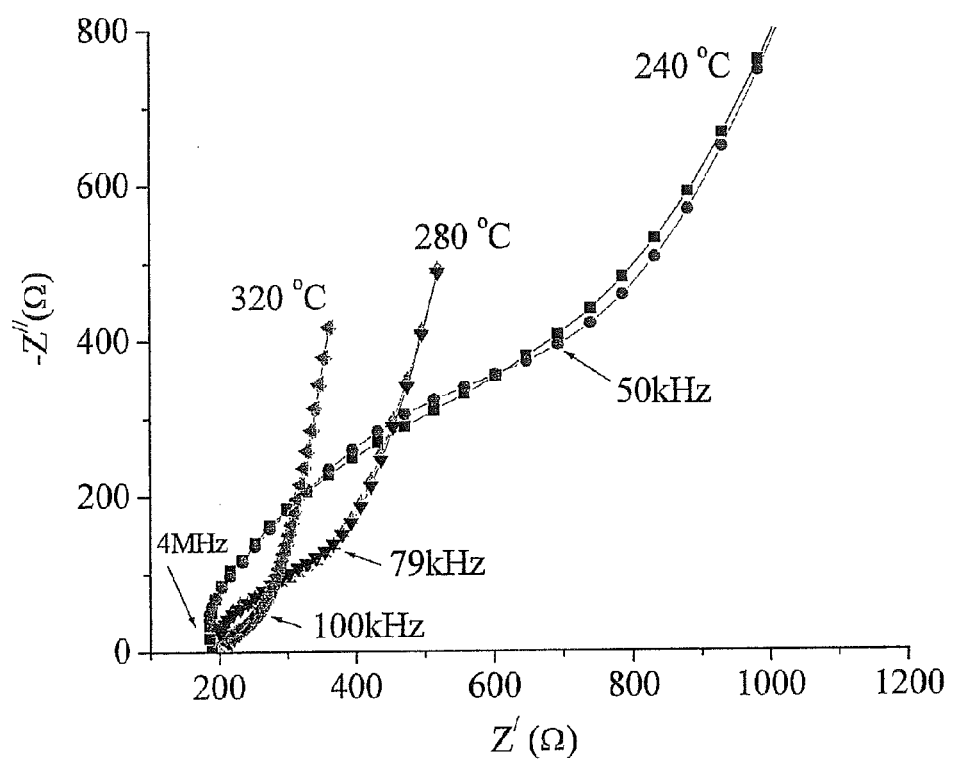
FIG. 9 shows the results of an impedance spectroscopy analysis on $Zr_{0.95}Y_{0.05}P_3$-400.

FIG. 9 shows the results of the impedance spectroscopy analysis on $Zr_{0.95}Y_{0.05}P_3$-400.

Figure 10:
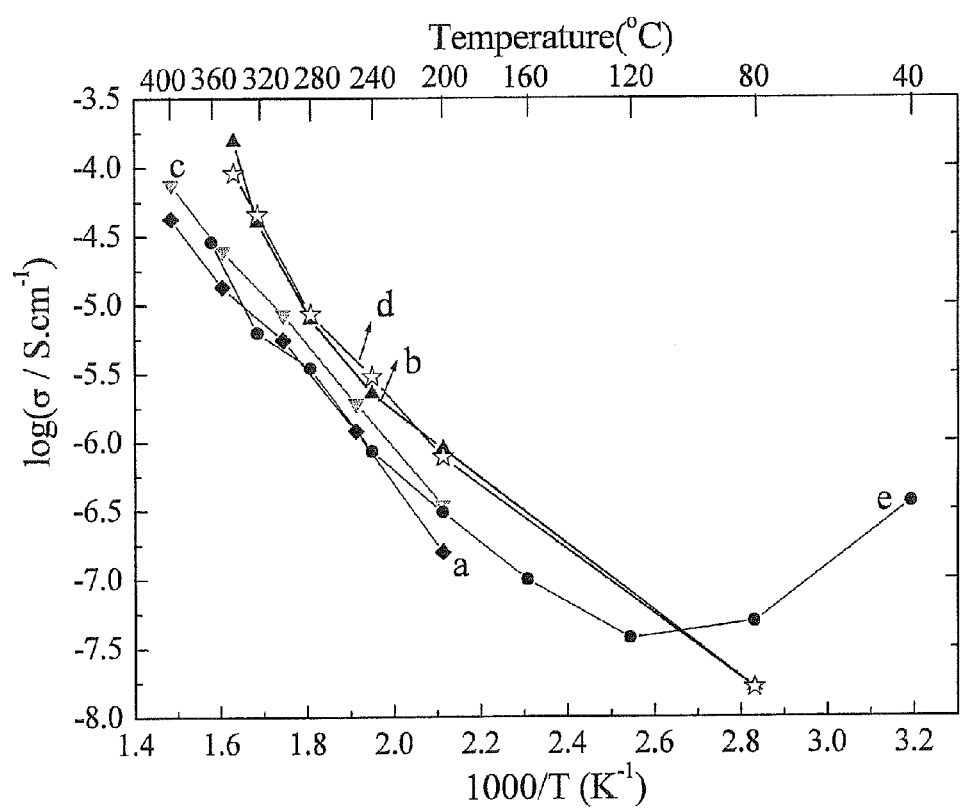
FIG. 10 shows temperature dependencies of proton conductivities of the thin membranes obtained in Example 2.

FIG. 10 shows temperature dependencies of proton conductivities of the thin membranes obtained in Example 2. The "a", "b", and "c" are results measured under a dry condition, whereas the "d" and "e" are results measured in the presence of moisture. The "a" signifies $ZrP_3$-400, each of the "b" and "d" signifies $Zr_{0.95}Y_{0.05}P_3$-400, the "c" signifies $Zr_{0.90}Y_{0.10}P_3$-40, and the "e" signifies $Zr_{0.95}Y_{0.05}P_3$-120. These results show that a thin membrane of the present invention exhibits a high proton conductivity equivalent to that of Nafion (Registered Trademark) even at a low temperature, under a dry condition, or in the presence of moisture.

Figure 11:
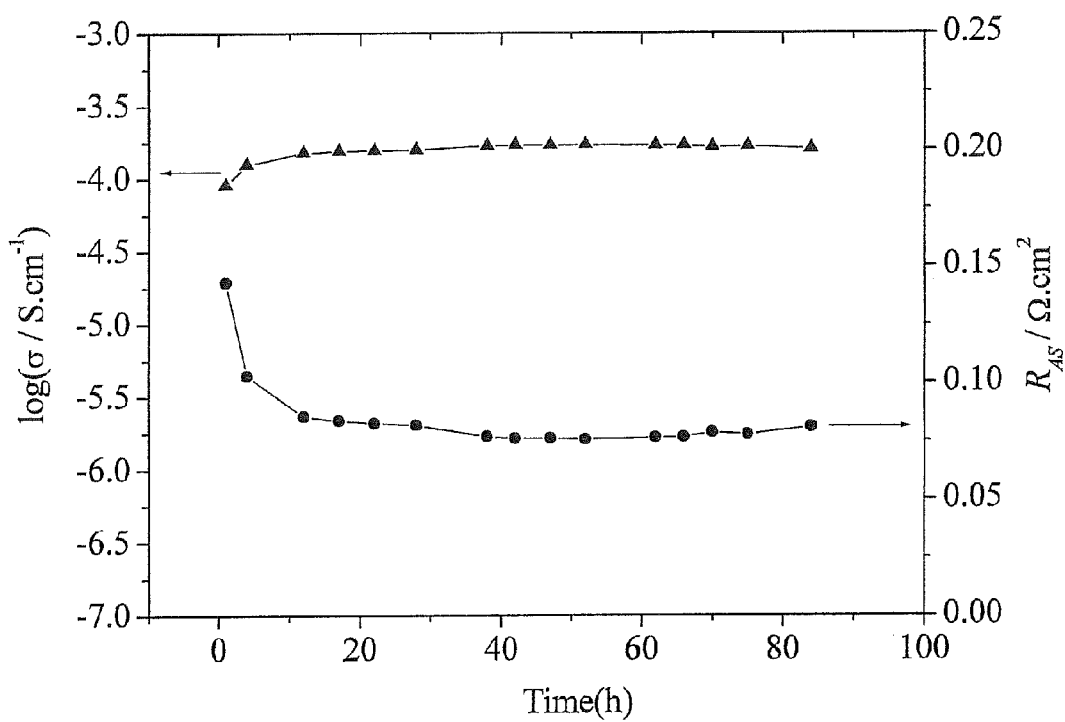
FIG. 11 shows the result of a measurement of a proton conductivity of $Zr_{0.95}Y_{0.05}P_3$-400, which measurement was performed at 340° C. for 80 hours under a dry condition.

FIG. 11 shows the result of the measurement of a proton conductivity of $Zr_{0.95}Y_{0.05}P_3$-400, which measurement was performed at 340° C. for 80 hours under a dry condition. The result in FIG. 11 shows that there was no damage or the like on the membrane, and that there was no change in the proton conductivity. This shows that a membrane of the present invention has a high stability.

Example 3

Production of Zirconium-Sulfuric Acid Thin Membrane and Production of Zirconium-Yttrium-Sulfuric Acid Thin Membrane (Pretreatment of ITO Substrate)

An ITO substrate was subjected to a pretreatment in the same manner as in Example 1.

(Preparation of Application Solution)

Zirconium-n-tetrabutoxide (manufactured by Kanto Chemical Co., Inc.) was added to 20 ml of 2-methoxyethanol. The resultant was stirred at room temperature for an hour, and further stirred at 70° C. for 30 minutes, so that a solution was obtained. Yttrium methoxyethoxide (manufactured by Gelest Inc.) was added to 20 ml of 2-methoxyethanol. The resultant was stirred at room temperature for an hour, and further stirred at 70° C. for 30 minutes, so that a solution was obtained. These solutions were cooled to room temperature. To each of the solutions, 96% sulfuric acid and ethylenediamine were added. Then, the solutions were subjected to ultrasonic treatment for approximately two minutes until the solutions became transparent. These solutions were mixed together, and stirred at room temperature for 10 minutes. Then, the resultant solution was adjusted so that an application solution finally obtained had a metal concentration of 20 mmol/L.

Note that the added amounts of zirconium-n-tetrabutoxide, yttrium methoxyethoxide, and the sulfuric acid were adjusted so that a molar ratio between zirconium, yttrium, and sulfur in each application solution was set to the value shown in Table below.

(Production of Thin Membrane)

Thin membranes were produced in the same manner as in Example 1. Annealing was performed at an annealing temperature of 400° C.

TABLE 3

| | Annealing Temp. (° C.) | Composition Ratio in Application Solution (Molar Ratio) | Abbreviation |
|---|---|---|---|
| Ex. 3 | 400 | $Zr/SO_4$ = 1.0/0.1 | $ZrSO_4$ |
| Ex. 3 | 400 | $Zr/Y/SO_4$ = 0.95/0.05/0.1 | $Zr_{0.95}Y_{0.05}SO_{4\,0.1}$ |
| Ex. 3 | 400 | $Zr/Y/SO_4$ = 0.95/0.1/0.1 | $Zr_{0.90}Y_{0.10}SO_{4\,0.1}$ |

Abbreviations in Table 3:
"Ex." stands for "Example".
"Temp." stands for "Temperature".

(Results)

The thin membranes obtained were evaluated as follows. Unless otherwise described, the measurements were performed in the same manner as in Example 1.

Figure 12:
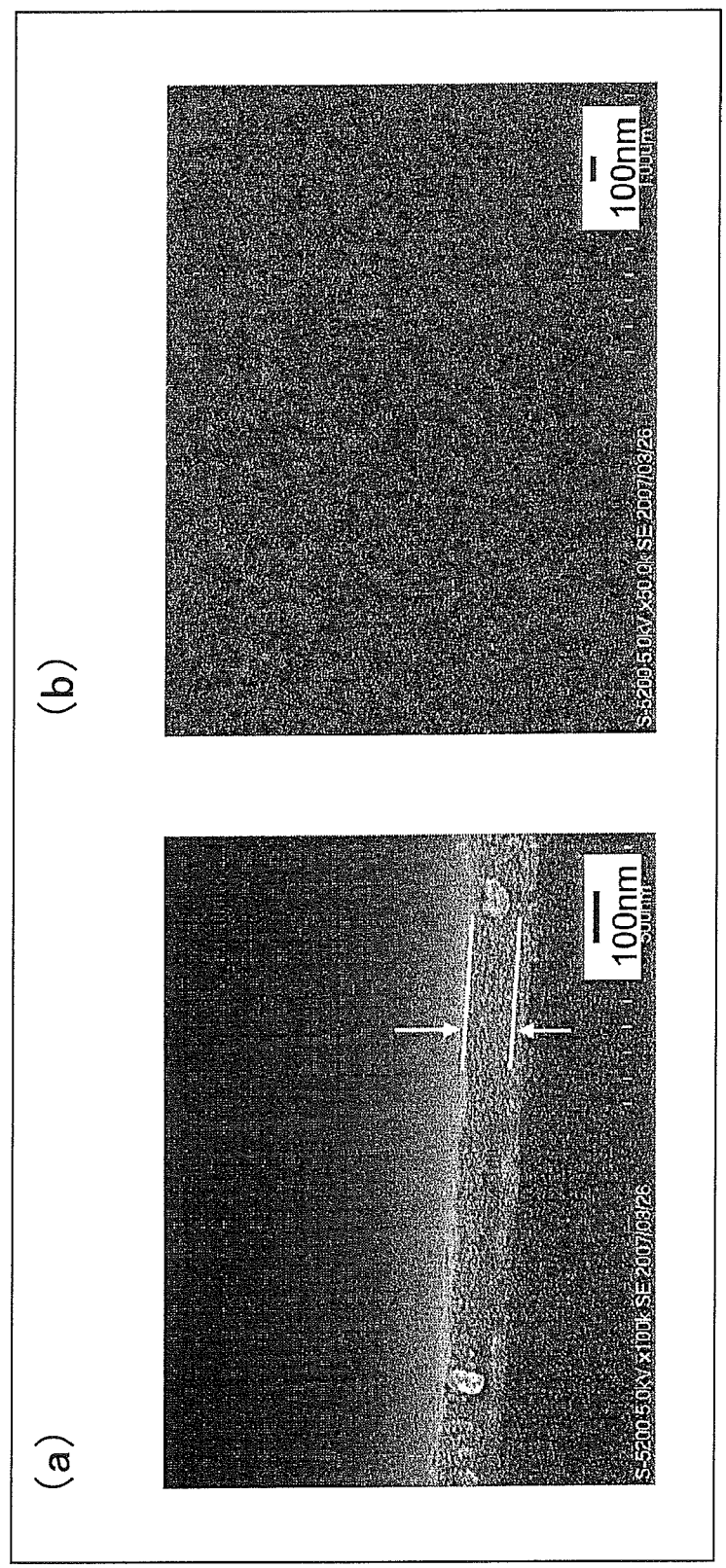
FIG. 12 shows the results of an SEM observation on $Zr_{0.95}Y_{0.05}SO_{4\,0.1}$.

FIG. 12 shows the results of the SEM observation on $Zr_{0.95}Y_{0.05}SO_{4\,0.1}$. (a) of FIG. 12 shows a cross section of the membrane, and (b) of FIG. 12 shows an upper surface of the membrane. From these, it was confirmed that $Zr_{0.95}Y_{0.05}SO_{4\,0.1}$ was a fine thin membrane having no crack or the like.

Figure 13:
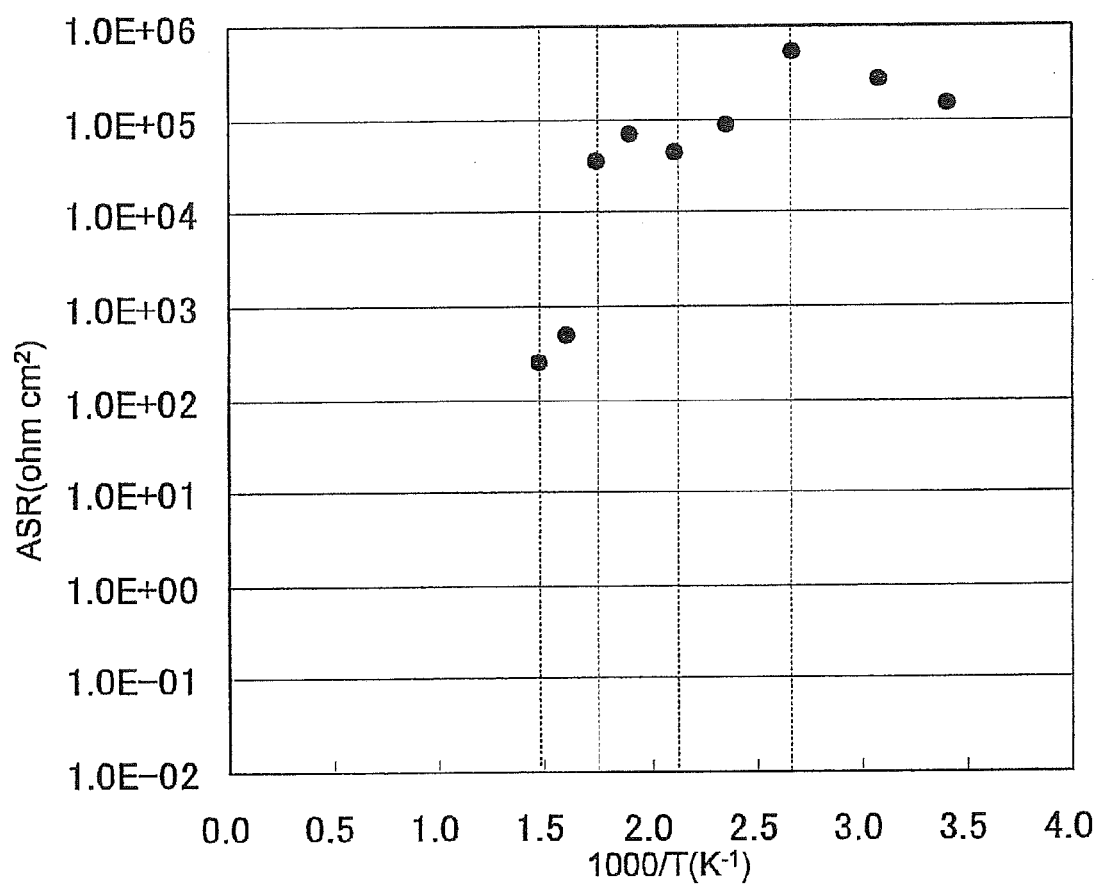
FIG. 13 shows a temperature dependency of a proton conductivity of $Zr_{0.95}Y_{0.05}SO_{4\,0.1}$.

FIG. 13 shows a temperature dependency of a proton conductivity of $Zr_{0.95}Y_{0.05}SO_{4\ 0.1}$. The data shown was obtained by the measurement performed under a dry condition. This result shows that the thin membrane in which the sulfuric acid was used as the oxygen acid also had a favorable proton conductivity, although the proton conductivity of this thin membrane was not as fine as that of a membrane in which a phosphoric acid was used.

Further, $ZrSO_4$ and $Zr_{0.90}Y_{0.10}SO_{4\ 0.1}$ were also found to have favorable proton conductivities, although their proton conductivities were not as fine as that of $Zr_{0.95}Y_{0.05}SO_{4\ 0.1}$.

Example 4

Production of Zirconium-Boric Acid Thin Membrane and Production of Zirconium-Yttrium-Boric Acid Thin Membrane (Pretreatment of ITO Substrate)
An ITO substrate was subjected to a pretreatment in the same manner as in Example 1.

(Preparation of Application Solution)
Zirconium-n-tetrabutoxide (manufactured by Kanto Chemical Co., Inc.) was added to 20 ml of 2-methoxyethanol. The resultant was stirred at room temperature for an hour, and further stirred at 70° C. for 30 minutes, so that a solution was obtained. Yttrium methoxyethoxide (manufactured by Gelest Inc.) was added to 20 ml of 2-methoxyethanol. The resultant was stirred at room temperature for an hour, and further stirred at 70° C. for 30 minutes, so that a solution was obtained. These solutions were cooled to room temperature. Then, the solutions were mixed together, and stirred at room temperature for 10 minutes. 20 ml of 2-methoxyethanol was added to a boric acid, and the resultant solution was subjected to ultrasonic treatment for approximately 15 minutes until the solution became transparent. These solutions were mixed together, and stirred at room temperature for two minutes. The resultant solution was adjusted so that an application solution finally obtained had a metal concentration of 20 mmol/L.

Note that the added amounts of zirconium-n-tetrabutoxide, yttrium methoxyethoxide, and the boric acid were adjusted so that a molar ratio between zirconium, yttrium, and boron in each application solution was set to the value shown in the Table below.

(Production of Thin Membrane)
Thin membranes were produced in the same manner as in Example 1. Annealing was performed at an annealing temperature of 400° C.

TABLE 4

| | Annealing Temp. (° C.) | Composition Ratio in Application Solution (Molar Ratio) | Abbreviation |
|---|---|---|---|
| Ex. 4 | 400 | Zr/B = 1.0/0.3 | ZrB |
| Ex. 4 | 400 | Zr/Y/B = 0.95/0.05/0.3 | $Zr_{0.95}Y_{0.05}B_{0.3}$ |
| Ex. 4 | 400 | Zr/Y/B = 0.95/0.1/0.3 | $Zr_{0.90}Y_{0.10}B_{0.3}$ |

Abbreviations in Table 4:
"Ex." stands for "Example".
"Temp." stands for "Temperature".

(Results)
The thin membranes obtained were evaluated as follows. Unless otherwise described, the measurements were performed in the same manner as in Example 1.

Figure 14:
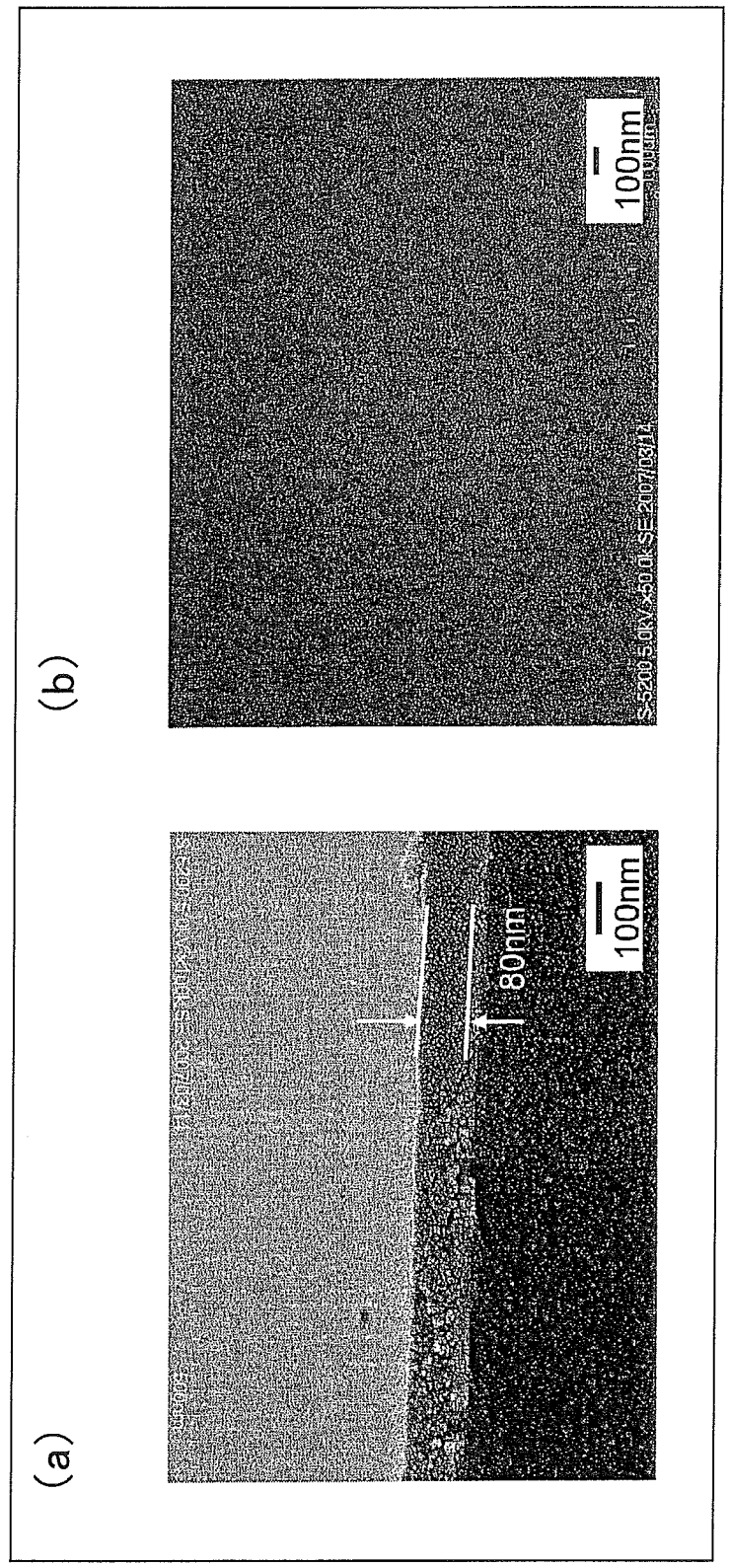
FIG. 14 shows the results of an SEM observation on $Zr_{0.95}Y_{0.05}B_{0.3}$.

FIG. 14 shows the results of the SEM observation on $Zr_{0.95}Y_{0.05}B_{0.3}$. (a) of FIG. 14 shows a cross section of the membrane, and (b) of FIG. 14 shows an upper surface of the membrane. From these, it was confirmed that $Zr_{0.95}Y_{0.05}B_{0.3}$ was a fine thin membrane having no crack or the like.

Figure 15:
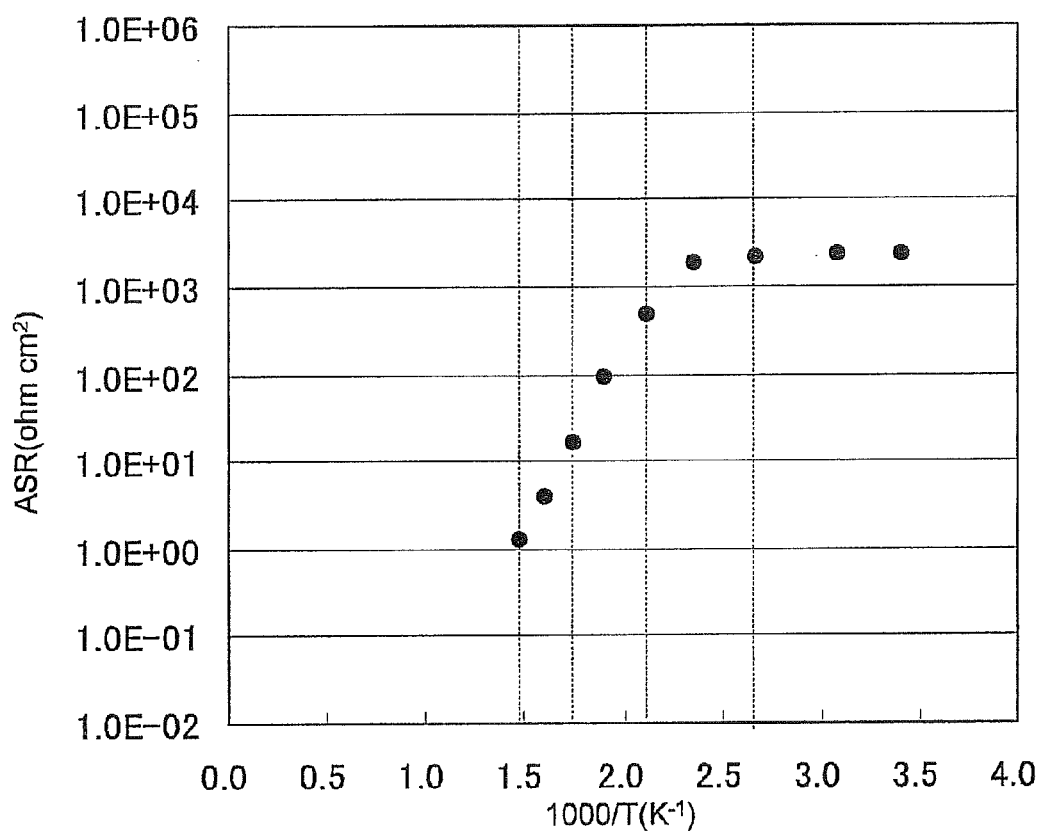
FIG. 15 shows a temperature dependency of a proton conductivity of $Zr_{0.95}Y_{0.05}B_{0.3}$.

FIG. 15 shows a temperature dependency of a proton conductivity of $Zr_{0.95}Y_{0.05}B_{0.3}$. The data shown was obtained by the measurement performed under a dry condition. This result shows that the thin membrane in which the boric acid was used as the oxygen acid also had a favorable proton conductivity, although the proton conductivity of this thin membrane was not as fine as that of a thin membrane in which a phosphoric acid was used.

Further, $Zr_{0.90}Y_{0.10}B_{0.3}$ and ZrB were also found to have favorable proton conductivities, although their proton conductivities were not as fine as that of $Zr_{0.95}Y_{0.05}B_{0.3}$.

The present invention makes it possible to provide a proton conducting membrane having an excellent proton conductivity. Further, a method of the present invention makes it possible to easily manufacture a proton conducting membrane having excellent properties.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention makes it possible to provide a proton conducting membrane having excellent properties by a sol-gel reaction and a thermal treatment, which are easy means. The proton conducting membrane obtained by the present invention is excellent in a proton conductivity and membrane stability. Further, the proton conducting membrane of the present invention is quite practical in that it exhibits a proton conductivity at a temperature in a range of 200° C. to 400° C. Furthermore, the proton conducting membrane of the present invention can be made with a simple composition. In addition, unlike Nafion (Registered Trademark) membrane, which is to be used under high humidity, the proton conducting membrane of the present invention does not require water control. Thus, the proton conducting membrane of the present invention has an advantage of being workable in a quite easy manner.

The invention claimed is:

1. A proton conducting membrane comprising, as a main component, a ceramic structure in which an oxygen atom is bonded to a metal atom and to at least one atom of boron, sulfur, phosphorous, carbon or nitrogen,
the ceramic structure being made by a sol-gel reaction of an oxygen acid of boron, sulfur, phosphorous, carbon or nitrogen and a precursor of an oxide of the metal in order to obtain a sol-gel reaction product, followed by heating of the sol-gel reaction product at a temperature in a range of 100° C. to 600° C.

2. The proton conducting membrane as set forth in claim 1, wherein the precursor of the oxide of the metal is a metal alkoxide.

3. The proton conducting membrane as set forth in claim 1, wherein the precursor of the oxide of the metal contains at least one tetravalent metal ion as a main component of its metal component.

4. The proton conducting membrane as set forth in claim 3, wherein said at least one tetravalent metal ion is selected from a hafnium ion, a titanium ion, a zirconium ion, and a tin ion.

5. The proton conducting membrane as set forth in claim 3, wherein the precursor of the oxide of the metal further contains at least one trivalent metal ion as its metal component.

6. The proton conducting membrane as set forth in claim 5, wherein said at least one trivalent metal ion is selected from an yttrium ion, an aluminum ion, an indium ion, a scandium ion, and lanthanoid ions including a lanthanum ion.

7. The proton conducting membrane as set forth in claim 5, wherein said at least one trivalent metal ion is contained in a range of 0.03 mol to 0.20 mol with respect to 1 mol of said at least one tetravalent metal ion.

8. The proton conducting membrane as set forth in claim 1, wherein the ceramic structure of the proton conducting membrane is amorphous.

9. A method for manufacturing a proton conducting membrane, comprising the steps of:
   subjecting an oxygen acid of boron, sulfur, phosphorous, carbon or nitrogen and a precursor of a metal oxide to a sol-gel reaction in order to obtain a sol-gel reaction product; and thereafter
   subjecting the sol-gel reaction product to a thermal treatment performed at a temperature in a range of 100° C. to 600° C., to obtain a ceramic structure in which an oxygen atom is bonded to a metal atom and to an atom of boron, sulfur, phosphorous, carbon or nitrogen that is the main component of said proton conducting membrane.

10. The method of claim 9, wherein the precursor of the metal oxide is a metal alkoxide.

11. The method as forth in claim 9, wherein the precursor of the metal oxide contains at least one tetravalent metal ion as a main component of its metal component.

12. The method as set forth in claim 11, wherein said at least one tetravalent metal ion is selected from a hafnium ion, a titanium ion, a zirconium ion, and a tin ion.

13. The method as set forth in claim 9, wherein the precursor of the metal oxide further contains at least one trivalent metal ion as its metal component.

14. The method as set forth in claim 13, wherein said at least one trivalent metal ion is selected from an yttrium ion, an aluminum ion, an indium ion, a scandium ion, and lanthanoid ions including a lanthanum ion.

15. The method as set forth in claim 14, wherein said at least one trivalent metal ion is contained in a range of 0.03 mol to 0.20 mol with respect to 1 mol of said at least one tetravalent metal ion.

* * * * *